(12) United States Patent
Liu

(10) Patent No.: US 9,166,505 B1
(45) Date of Patent: Oct. 20, 2015

(54) PROTECTION CIRCUITS FOR MOTORS

(71) Applicant: Marvell International Ltd., Hamilton (BM)

(72) Inventor: Chen Liu, Shanghai (CN)

(73) Assignee: MARVELL INTERNATIONAL LTD., Hamilton (BM)

( * ) Notice: Subject to any disclaimer, the term of this patent is extended or adjusted under 35 U.S.C. 154(b) by 8 days.

(21) Appl. No.: 14/254,374

(22) Filed: Apr. 16, 2014

Related U.S. Application Data

(60) Provisional application No. 61/828,333, filed on May 29, 2013.

(51) Int. Cl.
*H02H 7/08* (2006.01)
*H02P 6/12* (2006.01)

(52) U.S. Cl.
CPC ........................................ *H02P 6/12* (2013.01)

(58) Field of Classification Search
CPC ...... E02F 9/128; E02F 9/121; H02P 2101/45; H02P 9/04; B23K 9/1062
See application file for complete search history.

(56) References Cited

U.S. PATENT DOCUMENTS

| | | | | |
|---|---|---|---|---|
| 4,791,900 A * | 12/1988 | Buck et al. | ..................... | 123/359 |
| 6,118,186 A * | 9/2000 | Scott et al. | ................... | 290/40 B |
| 6,496,340 B1 * | 12/2002 | Hornberger et al. | ............ | 361/51 |
| 2006/0279970 A1 * | 12/2006 | Kernahan | ........................ | 363/65 |
| 2007/0273316 A1 * | 11/2007 | Yoshimatsu et al. | ........... | 318/371 |
| 2012/0001597 A1 * | 1/2012 | Gokan et al. | .................... | 322/15 |

* cited by examiner

*Primary Examiner* — Shawki S Ismail
*Assistant Examiner* — Zoheb Imtiaz

(57) ABSTRACT

System and methods are provided for protecting a direct current (DC) motor. A protection system includes: a motor drive component configured to drive a DC motor, a feedback component configured to generate a feedback signal related to motion of the DC motor, and a watchdog circuit configured to output a fault signal to the motor drive component to stop the DC motor in response to the feedback signal indicating abnormal motion of the DC motor. The watchdog circuit includes a hardware watchdog timer configured to be activated in response to one or more control signals and monitor the feedback signal.

15 Claims, 6 Drawing Sheets

PROTECTION CIRCUITS FOR MOTORS

CROSS-REFERENCE TO RELATED APPLICATIONS

This disclosure claims priority to and benefit from U.S. Provisional Patent Application No. 61/828,333, filed on May 29, 2013, the entirety of which is incorporated herein by reference.

FIELD

The technology described in this patent document relates generally to integrated circuits and more particularly to protection circuits.

BACKGROUND

Direct current (DC) motors are often used in many applications, such as computers, printers, automobiles, and stereos. Generally, a DC motor rotates based on a current passing through coils of a rotor of the DC motor to generate a magnetic force, so as to attract or repel a permanent magnet on a stator of the DC motor to make the motor rotate. In some applications, a technique of pulse width modulation (PWM) is often used to modulate the current passing through the DC motor, so as to save power as well as to control rotation speed of the DC motor. For example, the PWM technique usually involves adjusting a period ratio of a power supply transferring energy to the DC motor within a periodical square wave.

SUMMARY

In accordance with the teachings described herein, system and methods are provided for protecting a direct current (DC) motor. A protection system includes: a motor drive component configured to drive a DC motor, a feedback component configured to generate a feedback signal related to motion of the DC motor, and a watchdog circuit configured to output a fault signal to the motor drive component to stop the DC motor in response to the feedback signal indicating abnormal motion of the DC motor. The watchdog circuit includes a hardware watchdog timer configured to be activated in response to one or more control signals and monitor the feedback signal.

In one embodiment, an integrated circuit for protecting a DC motor includes: a motor drive circuit and a hardware watchdog timer. The motor drive circuit is configured to drive a DC motor. The hardware watchdog timer is configured to detect a feedback signal related to motion of the DC motor and output a fault signal to the motor drive circuit to stop the DC motor in response to the feedback signal indicating abnormal motion of the DC motor.

In another embodiment, a method is provided for protecting a DC motor. One or more control signals that affect motion of a DC motor are received. A feedback signal related to the motion of the DC motor is received. A watchdog circuit is activated in response to the one or more control signals. A fault signal is output by the watchdog circuit to disable a motor driver so as to stop the DC motor in response to the feedback signal indicating abnormal motion of the DC motor.

DETAILED DESCRIPTION

Figure 1:
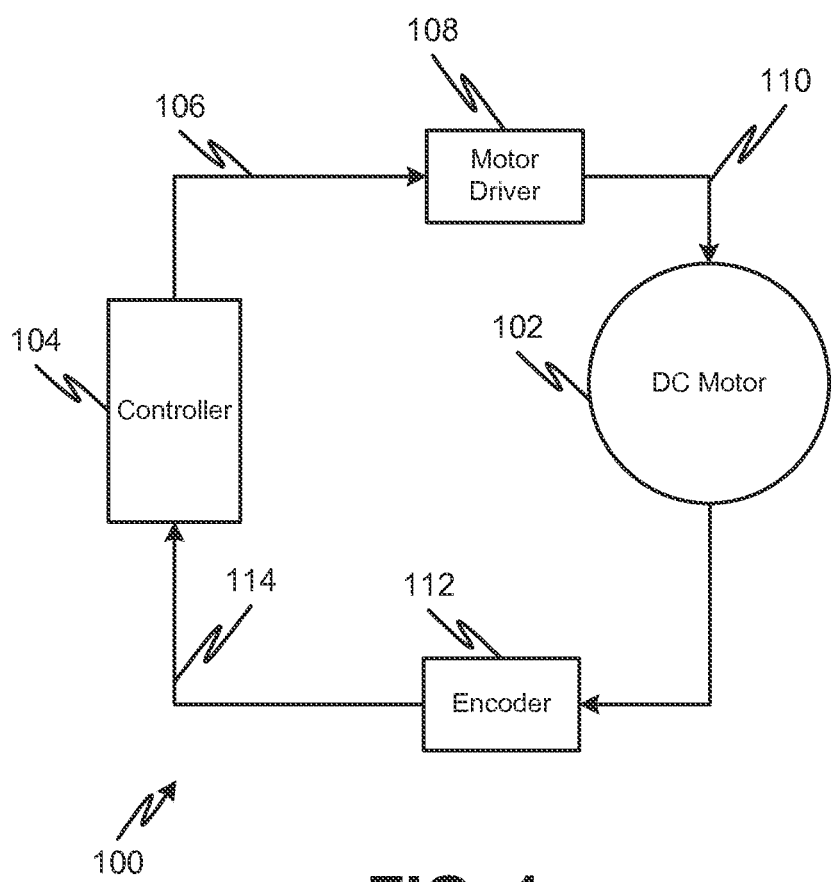
FIG. 1 depicts an example diagram for a DC motor system.

FIG. 1 depicts an example diagram for a DC motor system. As shown in FIG. 1, a DC motor system 100 implements a DC motor 102 in a closed-loop configuration. A controller 104 provides one or more control signals 106 to a motor driver 108 that outputs one or more drive signals 110 to drive the DC motor 102. For example, a shaft of the DC motor 102 rotates clockwise or counter-clockwise in response to the drive signals 110. The motor driver 108 may provide electrical power from a power source to the DC motor 102. Actual positions of the shaft of the DC motor 102 or the rotation velocity of the shaft is monitored through an encoder 112, and fed back to the controller 104 through a feedback signal 114 so that the controller 104 can change the control signals 106 to adjust the motion of the DC motor 102 to achieve desired results.

Figure 2:
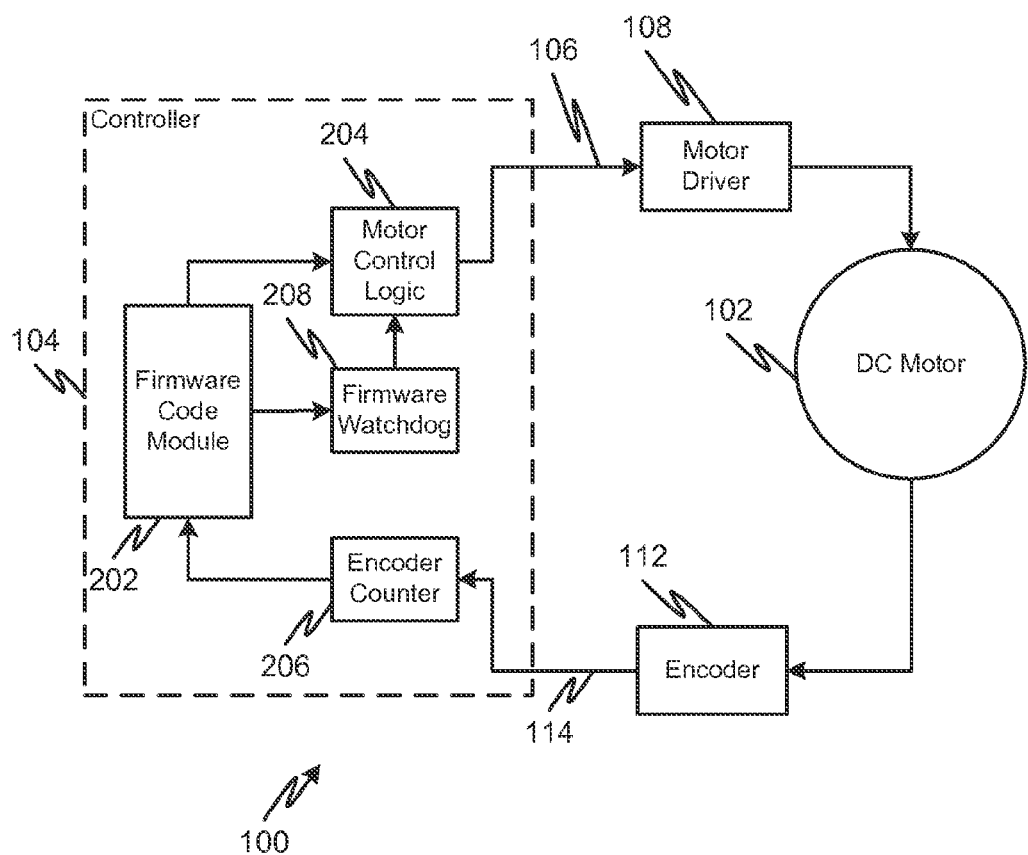
FIG. 2 depicts an example diagram showing a controller as part of the DC motor system as shown in FIG. 1.

FIG. 2 depicts an example diagram showing the controller 104 as part of the DC motor system 100. As shown in FIG. 2, a firmware code module 202 is used to operate with a motor control logic component 204 that outputs the control signals 106. An encoder counter 206 is used to process the feedback signal 114. Under certain faulty conditions (e.g., abnormal motions of the DC motor 102, rotations of the DC motor 102 slower than expected, etc.), a firmware watchdog timer 208 may output a timeout signal upon expiration of a programmable timeout period, e.g., to reset the motor driver 108 to stop the DC motor 102 for system protection. On the other hand, under normal conditions, the firmware code module 202 may periodically reset the firmware watchdog timer 208 to prevent the firmware watchdog timer 208 from outputting the timeout signal. The firmware watchdog timer 208, as a protection mechanism, has some disadvantages. For example, if the firmware code module 202 malfunctions, the firmware watchdog tinier 208 may not be reset periodically in time and may output a timeout signal to stop the DC motor 102 even under normal conditions.

Figure 3:
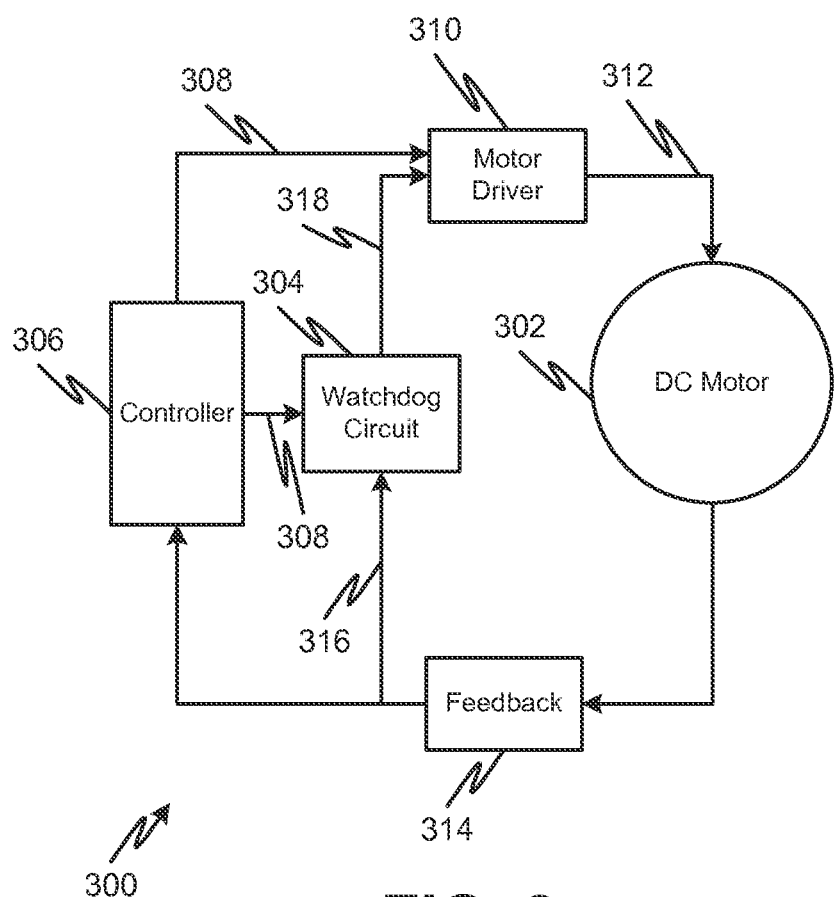
FIG. 3 depicts an example diagram for a DC motor system with a watchdog circuit.

FIG. 3 depicts an example diagram for a DC motor system with a watchdog circuit. As shown in FIG. 3, a DC motor system 300 implements a DC motor 302 in a closed-loop configuration. A watchdog circuit 304 is used for protecting the DC motor system 300.

Specifically, a controller 306 provides one or more control signals 308 to the motor driver 310 that outputs one or more drive signals 312 to drive the DC motor 302. For example, a shaft of the DC motor 302 rotates clockwise or counter-clockwise in response to the drive signals 312. A feedback component 314 monitors the motion of the DC motor 302 and provides a feedback signal 316 related to the motion of the DC motor 302 to the controller 306. In response to the feedback signal 316, the controller 306 can change the control signals 308 to adjust the motion of the DC motor 302. For example, the feedback component 314 includes an encoder that monitors actual positions of the shaft of the DC motor 302 or the rotation velocity of the shaft.

The watchdog circuit 304 is activated in response to the one or more control signals 308, and outputs a fault signal 318 in response to the feedback signal 316 under certain circumstances to stop the DC motor 302. For example, the watchdog circuit 304 may output the fault signal 318 when the feedback signal 316 indicates abnormal motion of the DC motor 302, e.g., the DC motor 302 not rotating in response to the control signals 308. In response to the fault signal 318, the motor driver 310 may be reset to stop the DC motor 302. In some embodiments, only when the motor driver 310 is activated, the watchdog circuit 304 is activated in response to the control signals 308. In certain embodiments, the watchdog circuit 304 is activated in response to the control signals 308 being larger than a predetermined threshold.

Figure 4:
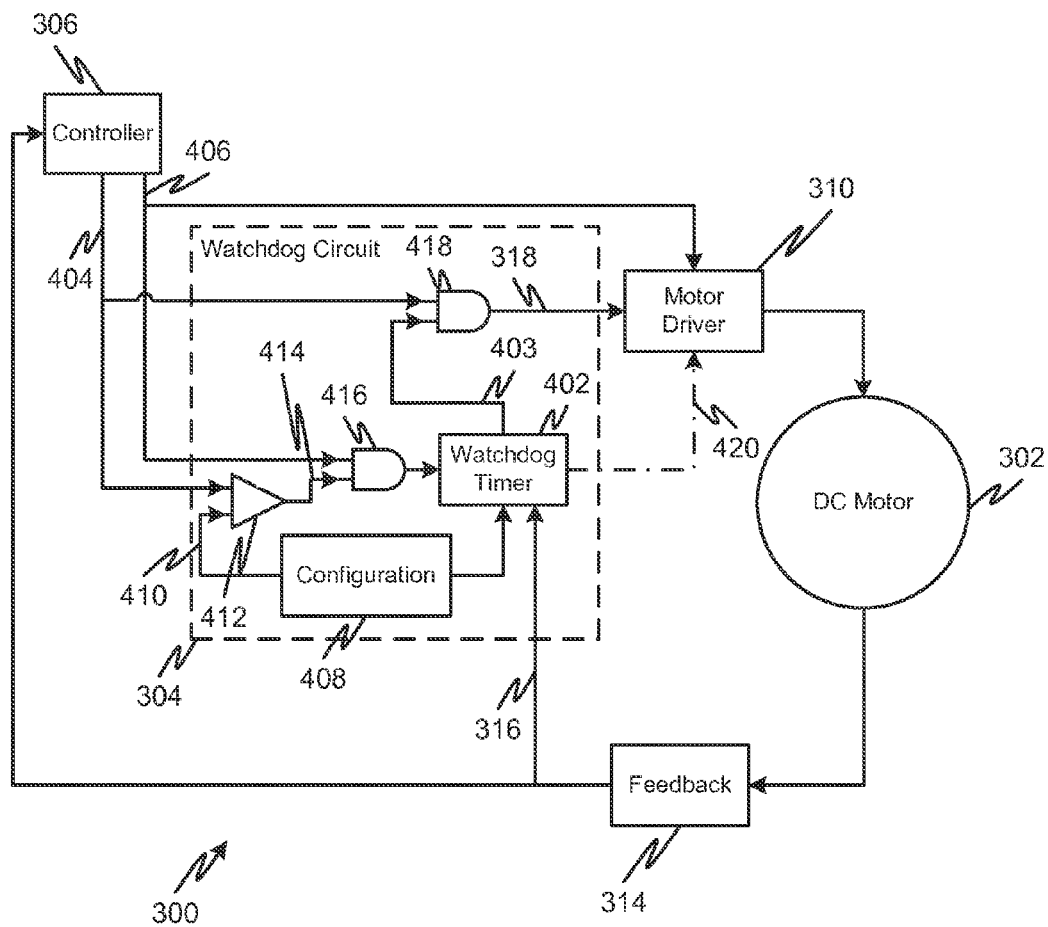
FIG. 4 depicts an example diagram showing a watchdog circuit as part of the DC motor system as shown in FIG. 3.

FIG. 4 depicts an example diagram showing the watchdog circuit 304 as part of the DC motor system 300. As shown in FIG. 4, a hardware watchdog timer 402 is implemented for protecting the DC motor 302. The hardware watchdog timer 402 is activated in response to two control signals—a modulation signal 404 (e.g., a pulse-width-modulation signal) and an enable signal 406 from the controller 306, and outputs a watchdog signal 403 in response to the feedback signal 316.

Specifically, a configuration component 408 provides a threshold signal 410 that corresponds to a threshold value input to a comparator 412. The comparator 412 compares the modulation signal 404 and the threshold signal 410 and outputs a comparison signal 414 indicating the comparison result. For example, if the modulation signal 404 is larger than the threshold value, the comparator 412 outputs the comparison signal 414 at a logic high level (e.g., "1"). An AND gate 416 implements a logic conjunction on the enable signal 406 and the comparison signal 414. For example, if the output of the AND gate 416 corresponds to the logic high level (e.g., "1"), the watchdog timer 402 is activated to monitor the feedback signal 316. In some embodiments, when the feedback signal 316 indicates abnormal motion of the DC motor 302 (e.g., the DC motor 302 not rotating in response to the control signals 308), the watchdog timer 402 outputs the watchdog signal 403 at a logic low level (e.g., "0"). As a result, another AND gate 418 that processes the modulation signal 404 and the watchdog signal 403 may output the fault signal 318 at the logic low level (e.g., "0") to stop the DC motor 302. In certain embodiments, the watchdog timer 402 outputs the watchdog signal 403 at the logic low level upon expiration of a predetermined time period after the feedback signal 316 indicates the abnormal motion of the DC motor 302. In some embodiments, the watchdog timer 402 outputs an interrupt signal 420 directly to the motor driver 310 to stop the DC motor 302 when the feedback signal 316 indicates that the DC motor 302 is stalled.

The control signals from the controller 306 include the modulation signal 404 and the enable signal 406. The motor driver 310 is enabled in response to the enable signal 406. The modulation signal 404 (e.g., a pulse-width-modulation signal) can be used to control the power supplied to the DC motor 302 and/or the speed of the DC motor 302. The configuration component 408 may set one or more parameters of the hardware watchdog timer 402, e.g., through firmware or hardware implementation.

Figure 5:
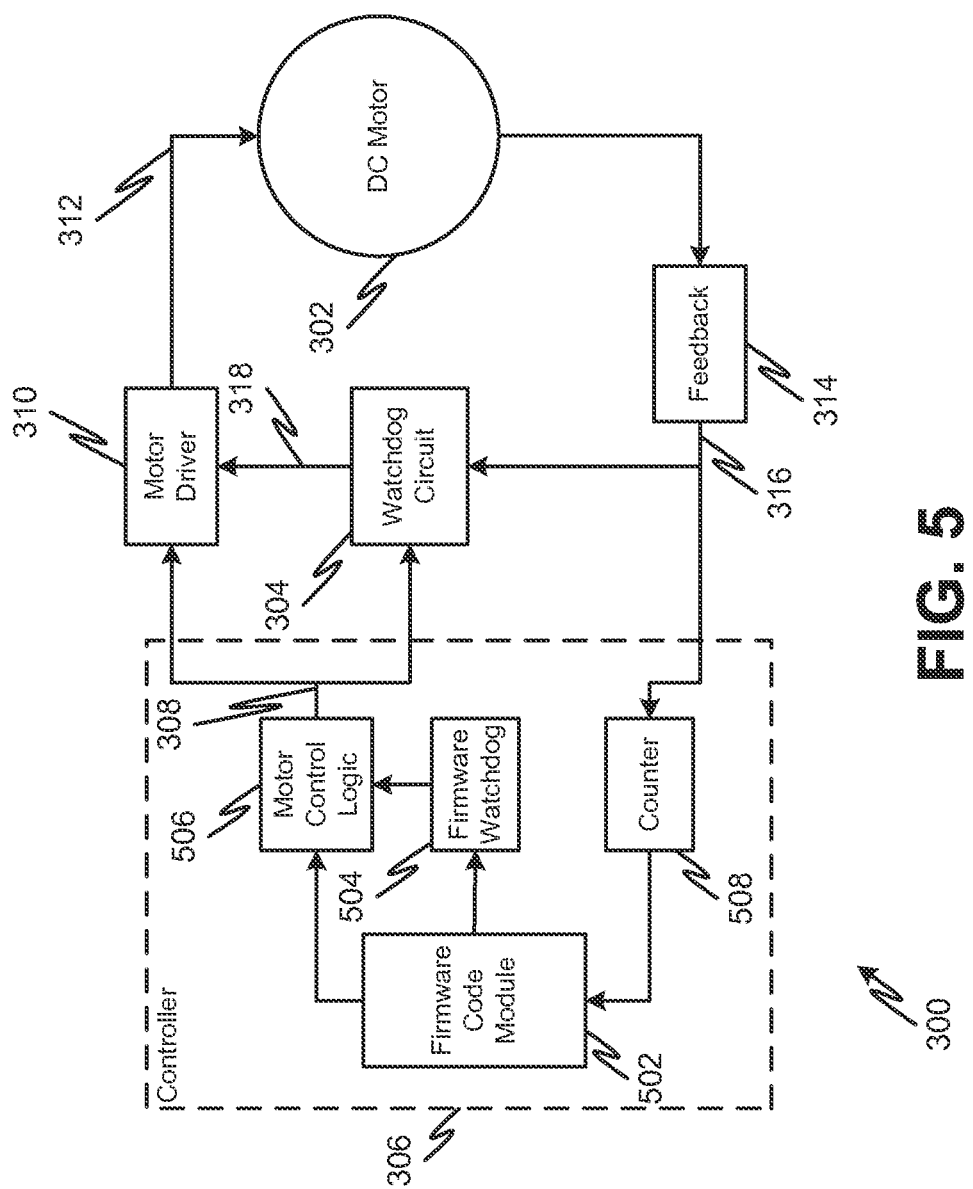
FIG. 5 depicts another example diagram for a DC motor system.

In addition to the watchdog circuit 304 that includes a hardware watchdog timer 402 as shown in FIG. 4, a firmware watchdog timer may be used to provide an extra protection mechanism fir the DC motor system 300. FIG. 5 depicts another example diagram for the DC motor system 300. As shown in FIG. 5, a firmware code module 502 operates together with a motor control logic component 506 that outputs the control signals 308. A counter component 508 is used to process the feedback signal 316. Under certain faulty conditions (e.g., abnormal motions of the DC motor 302, rotations of the DC motor 102 slower than expected, etc.), a firmware watchdog timer 504 may output a timeout signal upon expiration of a programmable timeout period to stop the DC motor 302 for system protection. On the other hand, under normal conditions, the firmware code module 502 may periodically reset the firmware watchdog timer 504 to prevent the firmware watchdog timer 504 from outputting the timeout signal.

Figure 6:
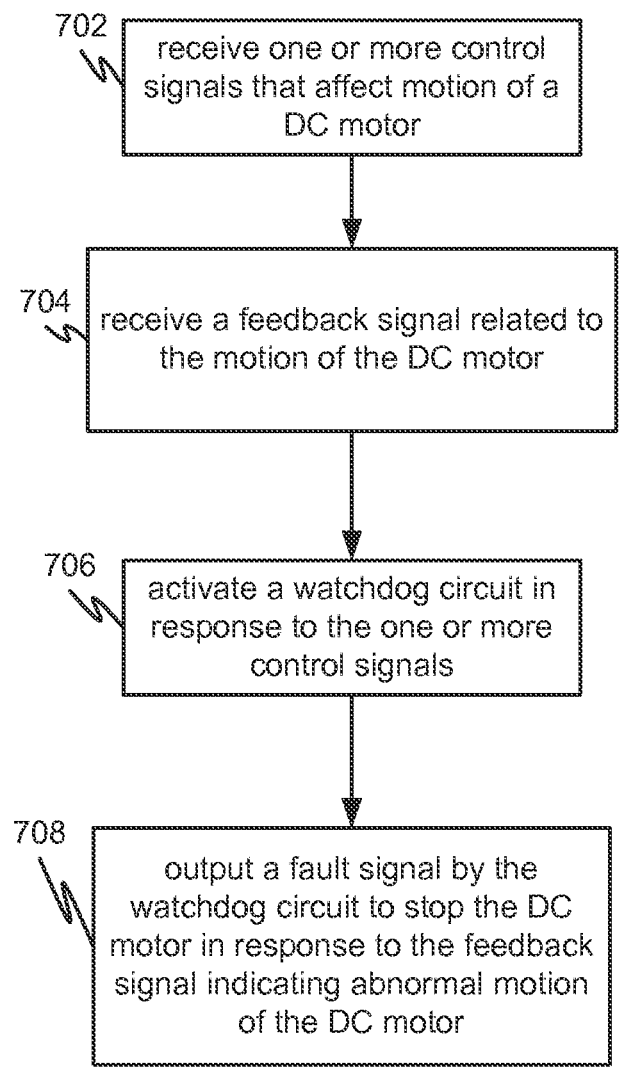
FIG. 6 depicts an example flow diagram for protecting a DC motor.

FIG. 6 depicts an example flow diagram for protecting a DC motor. At 702, one or more control signals that affect motion of a DC motor are received. For example, the control signals may include a modulation signal (e.g., a pulse-width-modulation signal) that can be used to control the power supplied to the DC motor and/or the speed of the DC motor. In addition, the control signals may include an enable signal to enable the DC motor. At 704, a feedback signal related to the motion of the DC motor is received. For example, the feedback signal is generated by an encoder. At 706, a watchdog circuit is activated in response to the one or more control signals. As an example, the watchdog circuit includes a hardware watchdog timer configured to monitor the feedback signal. At 708, a fault signal is output by the watchdog circuit to stop the DC motor in response to the feedback signal indicating abnormal motion of the DC motor.

This written description uses examples to disclose the invention, include the best mode, and also to enable a person skilled in the art to make and use the invention. The patentable scope of the invention may include other examples that occur to those skilled in the art. For example, the systems and methods described herein may be implemented for over-current protection of a direct current motor system. Other implementations may also be used, however, such as firmware or appropriately designed hardware configured to carry out the methods and systems described herein. For example, the systems and methods described herein may be implemented in an independent processing engine, as a co-processor, or as a hardware accelerator. In yet another example, the systems and methods described herein may be provided on many different types of computer-readable media including computer storage mechanisms (e.g., CD-ROM, diskette, RAM, flash memory, computer's hard drive, etc.) that contain instructions (e.g., software) for use in execution by one or more processors to perform the methods' operations and implement the systems described herein.

What is claimed is:

1. A protection system for a direct current (DC) motor, comprising:
   a motor drive component configured to drive a DC motor;
   a feedback component configured to generate a feedback signal related to motion of the DC motor; and
   a watchdog circuit configured to output a fault signal to the motor drive component to stop the DC motor in response to the feedback signal indicating abnormal motion of the DC motor, wherein the watchdog circuit includes:
   a comparator configured to generate a comparison signal indicating a comparison of (i) a modulation signal output by a motor controller and (ii) a threshold signal;
   a first AND gate configured to receive the comparison signal and an enable signal and generate an first signal;
   a hardware watchdog timer configured to receive the first signal and the feedback signal and generate a watchdog signal; and
   a second AND gate configured to receive the modulation signal and the watchdog signal and generate a second signal to affect the motion of the DC motor.

2. The system of claim 1, wherein the hardware watchdog timer is further configured to be activated in response to the first signal being at a first logic level and output the watchdog signal at a second logic level in response to the feedback signal indicating abnormal motion of the DC motor.

3. The system of claim 1, further comprising:
a firmware watchdog timer configured to output a time-out signal upon expiration of a predetermined time period to the motor control component to change the one or more control signals; and
a firmware code module configured to reset the firmware watchdog timer in response to the feedback signal.

4. The system of claim 1, wherein the feedback component includes an encoder configured to generate the feedback signal related to the motion of the DC motor.

5. The system of claim 1, wherein the feedback component is further configured to generate the feedback signal to indicate position information or velocity information associated with the DC motor.

6. The system of claim 1, wherein the watchdog circuit is further configured to output the fault signal to reset the motor drive component to stop the DC motor.

7. The system of claim 1, wherein the watchdog circuit is further configured to output the fault signal upon expiration of a predetermined time period after the feedback signal indicates abnormal motion of the DC motor.

8. The system of claim 1, wherein the watchdog circuit is further configured to output the fault signal when the feedback signal indicates that the DC motor does not rotate in response to one or more control signals.

9. An integrated circuit for protecting a direct current (DC) motor, comprising:
a motor drive circuit configured to drive a DC motor; and
a hardware watchdog timer configured to detect a feedback signal related to motion of the DC motor and output a fault signal to the motor drive circuit to stop the DC motor in response to the feedback signal indicating abnormal motion of the DC motor, wherein the hardware watchdog timer is configured to be activated in response to one or more control signals that include (i) a modulation signal output by a motor controller and (ii) an enable signal;
a comparator configured to compare the modulation signal and a threshold signal and generate a comparison signal indicating the comparison of the modulation signal and the threshold signal;
a first AND gate configured to receive the comparison signal and the enable signal and generate an activation signal to activate the hardware watchdog timer; and
a second AND gate configured to receive the modulation signal and the fault signal and generate a first signal to affect the motion of the DC motor.

10. The integrated circuit of claim 9, wherein the hardware watchdog timer is further configured to output the fault signal upon expiration of a predetermined time period after the feedback signal indicates abnormal motion of the DC motor.

11. The integrated circuit of claim 9, wherein the hardware watchdog timer is further configured to output the fault signal when the feedback signal indicates that the DC motor does not rotate in response to the one or more control signals.

12. The integrated circuit of claim 9, further comprising:
a configuration component configured to output the threshold signal and set one or more parameters related to the hardware watchdog timer.

13. The integrated circuit of claim 9, wherein the hardware watchdog timer is further configured to be activated when the one or more control signals are larger than a predetermined threshold.

14. The integrated circuit of claim 9, wherein the feedback signal indicates position information or velocity information associated with the DC motor.

15. A method for protecting a direct current (DC) motor, comprising:
generating, by a feedback component, a feedback signal related to motion of a DC motor; and
outputting, by a watchdog circuit, a fault signal to a motor drive component that drives the DC motor, to stop the DC motor in response to the feedback signal indicating abnormal motion of the DC motor, by the watchdog circuit performing steps of:
generating a comparison signal indicating a comparison of (i) a modulation signal output by a motor controller and (ii) a threshold signal;
inputting the comparison signal and an enable signal into a first AND gate to generate a first signal;
inputting the first signal and the feedback signal into a hardware watchdog timer to generate a watchdog signal; and
inputting the modulation signal and the watchdog signal into a second AND gate to generate a second signal to affect the motion of the DC motor.

\* \* \* \* \*